(12) United States Patent
Lu

(10) Patent No.: US 10,606,160 B2
(45) Date of Patent: Mar. 31, 2020

(54) ADJUSTING DEVICE FOR LIGHT-PIPE AND PROJECTOR

(71) Applicants: Qingdao Hisense Electronics Co., Ltd., Qingdao, Shandong (CN); Hisense International Co., Ltd., Qingdao, Shandong (CN); Hisense USA Corp., Suwanee, GA (US)

(72) Inventor: Wensheng Lu, Shandong (CN)

(73) Assignees: QINGDAO HISENSE ELECTRONICS CO., LTD., Qingdao, Shandong (CN); HISENSE USA CORP., Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 197 days.

(21) Appl. No.: 15/951,601

(22) Filed: Apr. 12, 2018

(65) Prior Publication Data
US 2019/0094674 A1 Mar. 28, 2019

(30) Foreign Application Priority Data
Sep. 26, 2017 (CN) .......................... 2017 1 0885034

(51) Int. Cl.
*G03B 21/20* (2006.01)
*G02B 7/00* (2006.01)
(Continued)

(52) U.S. Cl.
CPC ....... *G03B 21/2053* (2013.01); *G02B 6/0008* (2013.01); *G02B 6/0096* (2013.01);
(Continued)

(58) Field of Classification Search
CPC ...... G03B 21/20; G03B 21/28; G03B 21/145; G03B 21/208; G03B 21/2013;
(Continued)

(56) References Cited

U.S. PATENT DOCUMENTS

2007/0040990 A1  2/2007  Chen
2007/0091285 A1  4/2007  Teng et al.
(Continued)

FOREIGN PATENT DOCUMENTS

CN       1873516 A    12/2006
CN     101320198 A     2/2008
(Continued)

OTHER PUBLICATIONS

Office Action for Chinese Patent Application No. 201710885034.7 dated Feb. 19, 2019; 8 pages.
(Continued)

*Primary Examiner* — Sultan Chowdhury
(74) *Attorney, Agent, or Firm* — Brinks Gilson & Lione; Yuezhong Feng

(57) ABSTRACT

An adjusting device for a light-pipe includes an outer tube, a rotatable ball, an inner tube and an adjustment member. The inner tube is configured to accommodate the light-pipe. The outer tube comprises a first end and a second end disposed oppositely, and a receiving cavity constructed to receive the rotatable ball is formed in the first end of the outer tube. The rotatable ball is hinged in the receiving cavity, and a through-hole is opened in the rotatable ball. One end of the inner tube is fixedly connected to the through-hole, and the other end is disposed inside the second end of the outer tube through the adjustment member. The adjustment member is configured to drive the inner tube to swing along the center of the rotatable ball within the outer tube.

20 Claims, 7 Drawing Sheets

(51) Int. Cl.
*F21V 8/00* (2006.01)
*G03B 21/14* (2006.01)

(52) U.S. Cl.
CPC ........... *G02B 7/003* (2013.01); *G03B 21/142* (2013.01); *G03B 21/2046* (2013.01); *G03B 21/208* (2013.01)

(58) Field of Classification Search
CPC ........... G03B 21/2033; G03B 21/2053; G03B 21/2066; H04N 9/315; H04N 9/3141; H04N 9/3155; H04N 9/3161; H04N 9/3164; G02B 6/0096; G02B 6/0008
See application file for complete search history.

(56) References Cited

U.S. PATENT DOCUMENTS

2009/0262315 A1* 10/2009 Tseng .................. G03B 21/14
353/119

2009/0296051 A1* 12/2009 Huang ................. G03B 27/547
353/122

FOREIGN PATENT DOCUMENTS

| CN | 101162360 A | 4/2008 |
| CN | 101169582 A | 4/2008 |
| CN | 201532518 U | 7/2010 |
| CN | 103323951 A | 9/2013 |
| CN | 204256240 U | 4/2015 |
| CN | 205404930 U | 7/2016 |

OTHER PUBLICATIONS

Second Office Action with English Translation for Chinese Patent Application No. 201710885034.7 dated May 30, 2019; 15 pages.
International Search Report and Written Opinion for corresponding International Application No. PCT/CN2018/082864 dated Jun. 28, 2018; 11 pages.

* cited by examiner

ADJUSTING DEVICE FOR LIGHT-PIPE AND PROJECTOR

CROSS-REFERENCE TO RELATED APPLICATION

This application claims priority to Chinese Patent Application No. 201710885034.7, filed on Sep. 26, 2017, titled "ADJUSTING DEVICE FOR A LIGHT-PIPE AND PROJECTOR", which is incorporated herein by reference in its entirety.

TECHNICAL FIELD

The present disclosure relates to a technical field of projection equipment, more particularly, to an adjusting device for a light-pipe and a projector.

BACKGROUND

Typically, in a light source component used for projection, the output light of the light source component is not homogeneous enough. If the output light is emitted directly, the quality of the projection will be affected. Therefore, usually a light-homogenizing device, for example a light-pipe, is provided in the projector to homogenize the output light of the light source component, and then the homogenized light enter into an imaging component.

In the practical application of the light-pipe, the light entrance side of the light-pipe needs to be aligned with the light exit side of the light source component, and the light exit side of the light-pipe needs to be aligned with the light entrance on the shell of the imaging component. But due to assembly errors, the actual position of the light-pipe typically deviates from the above expected position. In order to solve the problem, an adjusting device for the light-pipe usually may be connected to the light-pipe to adjust the position of the light-pipe, so that the light entrance side and the light exit side of the light-pipe can be aligned with the light exit side of the light source component and the light entrance on the shell of the imaging component, respectively.

SUMMARY

A first embodiment of the disclosure provides an adjusting device for a light-pipe. The adjusting device comprises an outer tube, a rotatable ball, an inner tube and an adjustment member. The inner tube is configured to accommodate the light-pipe. The outer tube comprises a first end and a second end disposed oppositely, and a receiving cavity configured to receive the rotatable ball is formed in the first end of the outer tube. The rotatable ball is hinged in the receiving cavity, and a through-hole is opened in the rotatable ball. One end of the inner tube is fixedly connected to the through-hole, and another end of the inner tube is disposed inside the second end of the outer tube through the adjustment member. The adjustment member is configured to drive the inner tube to swing along the center of the rotatable ball within the outer tube.

A second embodiment of the disclosure provides a projector comprising a light source component, a light-pipe, an adjusting device for the light-pipe and an imaging component with a shell; wherein, the shell is located on the light exit end of the light source component, a light entrance is opened on the shell at a position opposite to the light exit side of the light source component; the adjusting device for the light-pipe is provided between the light exit side of the light source component and the light entrance of the shell, the adjusting device is that according to the above solution, a first end of the outer tube of the light-pipe faces a light exit side of the light source component, and a second end of the outer tube faces the light entrance of the shell; the light-pipe is accommodated in the inner tube of the adjusting device, and the end surface of the light light-pipe located inside the first end of the outer tube is opposite to the light exit side of the light source component.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

Figure 1:
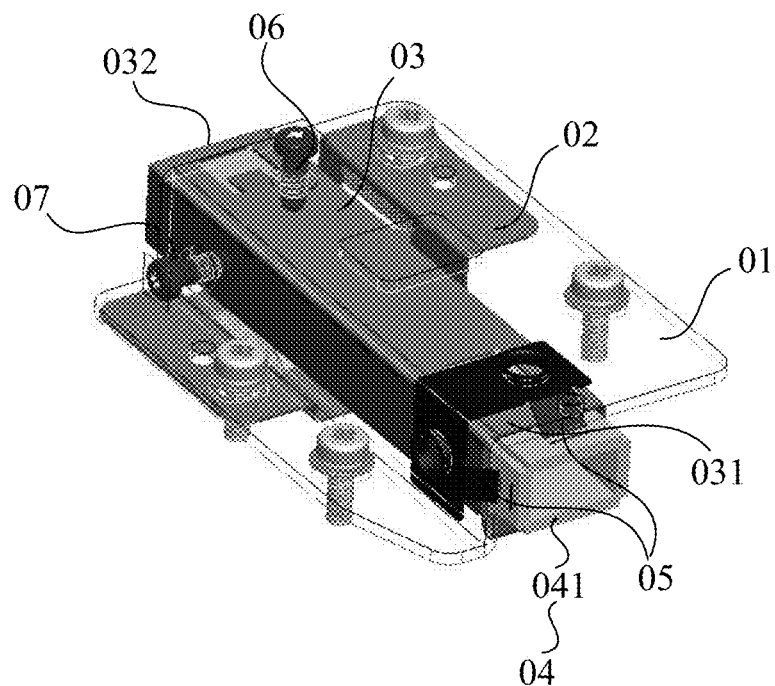
FIG. 1 shows a schematic structural view of an exemplary adjusting device for a light-pipe from a certain viewing angle.

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The embodiments of the disclosure will be described below in detail with reference to the accompanying drawings. It should be understood that embodiments described herein are only for illustration and explanation of the disclosure, but not for limitation to the disclosure.

In the description of the present disclosure, it should be understood that the orientations or positional relationships indicated by the terms such as "center", "upper", "lower", "front", "back", "left", "right", "vertical", "horizontal", "top," "bottom", "inner" and "outer" are based on the orientation or positional relationship shown in the drawings and are merely for ease of description of the present disclosure and simplified description, and are not indicative or implied that the devices or elements referred to must have a particular orientation, be constructed and operated in a particular orientation, and therefore should not be construed to limit the present disclosure. In the description of the present disclosure, unless otherwise specified, "a plurality of" means two or more than two.

Figure 2:
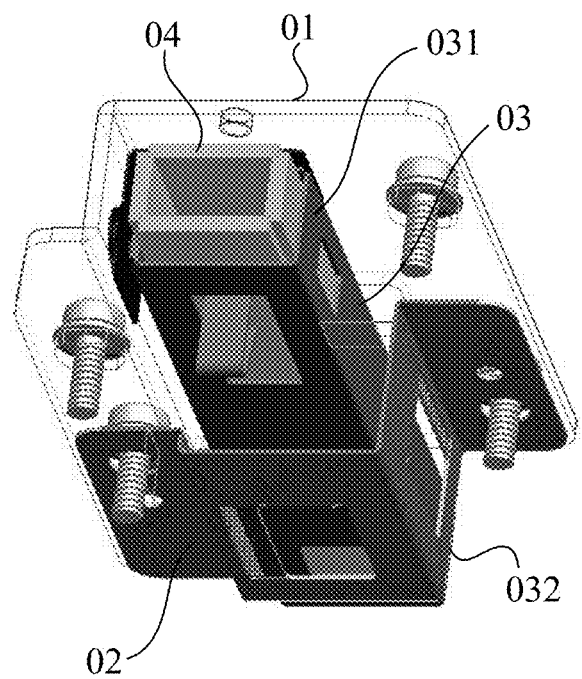
FIG. 2 shows a schematic structural view of the adjusting device for a light-pipe shown in FIG. 1 from another certain viewing angle.

FIG. 1 and FIG. 2 show an adjusting device for a light-pipe. Referring to FIGS. 1 and 2, the adjusting device for a light-pipe includes a first bracket 01, a second bracket 02, a bearing member (not shown in the figures) and a cylindrical protective shell 03. The first bracket 01, the second bracket 02 and the bearing member surround a mounting hole. The protective shell 03 is located in the mounting hole. The protective shell 03 includes a first end 031 and a second end 032, and the first and second ends are oppositely disposed. A light-pipe 04 is installed in the protective shell 03, and the light entrance end 041 of the light-pipe protrudes from the first end 031 of the protective shell, and the light exit end of the light-pipe is located at the second end 032 of the protective shell. A limiting elastic piece 05 is fixed at the position on the first support 01 corresponding to the light entrance end 041 of the light-pipe. The limiting elastic piece 05 can apply an elastic limit force to the light entrance end 041 of the light-pipe to press the light entrance end 041 of the light-pipe against the bearing member, so as to limit the position of the light entrance end 041 of the light-pipe. The upper surface and the lower surface of the second end 032 of the protective shell are respectively provided with a first adjustment screw 06 and a first elastic piece (not shown in the figures). The left side surface and the right side surface of the second end 032 of the protective shell are respectively provided with a second adjustment screw 07 and a second elastic piece (not shown in figures). Through the cooperation of the above two sets of adjustment screws and elastic pieces, the position of the second end 032 of the protective shell in the mounting hole is adjusted, so that the position of the light exit end of the light-pipe is adjusted. When the adjusting device for a light-pipe with a light-pipe as shown in FIG. 1 and FIG. 2 is connected between the light source component and the imaging component, the relative positions of the light source component, the imaging component, the first bracket 01, the second bracket 02 and the bearing member is fixed, and the light entrance end of the light-pipe is aligned with the light exit side of the light source component. Then, the position of the light exit end of the light-pipe is adjusted by adjusting the adjustment screw so that the light exit side of the light-pipe 04 is aligned with light entrance on the shell of the imaging component.

Figure 3:
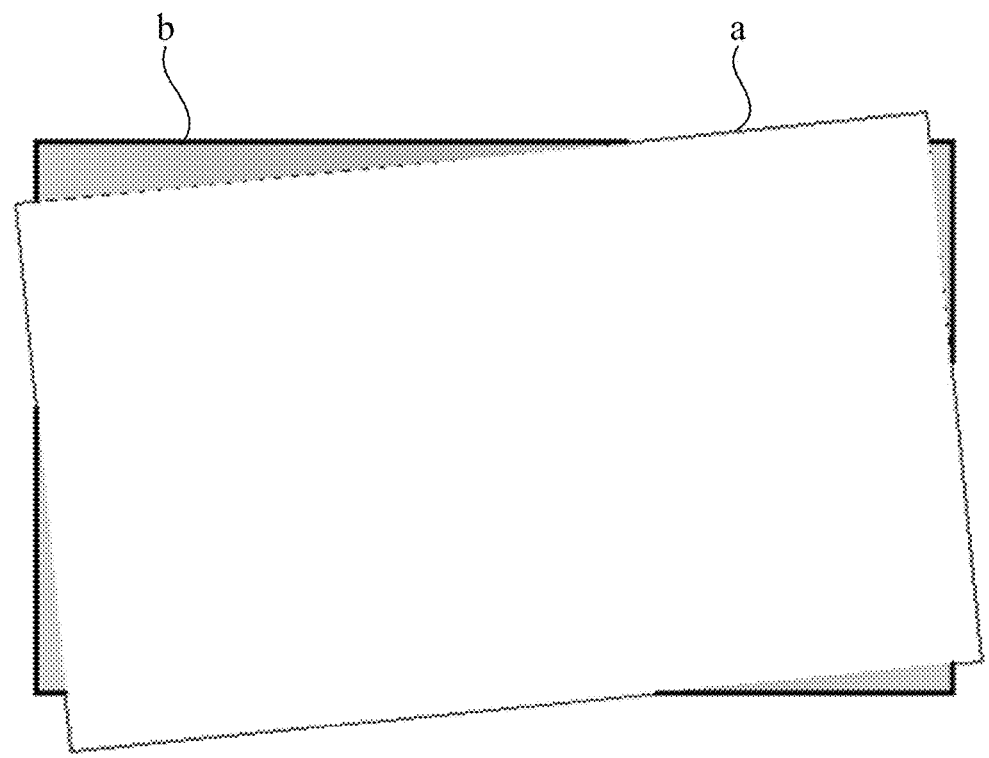
FIG. 3 shows a schematic view of the positional relationship between a projection image and a screen of a projector installed with the adjusting device for a light-pipe shown in FIG. 1.

In the adjusting device for a light-pipe shown in FIG. 1 and FIG. 2, the light entrance end 041 of the light-pipe is limited by the limiting elastic piece 05, but the limiting accuracy of the elastic piece is generally low, and the elastic force of the elastic piece is difficult to control. Therefore, when the position of the light exit end of the light-pipe is adjusted by the first adjustment screw 06 and the second adjustment screw 07, the light entrance end 041 of the light-pipe easily overcomes the elastic force of the limiting elastic piece 05 to cause a misalignment, so that the light-pipe 04 generates an offset or deflection as a whole. In this way, the projection image of the projector is easily deflected on the screen b as shown in FIG. 3.

Figure 4:
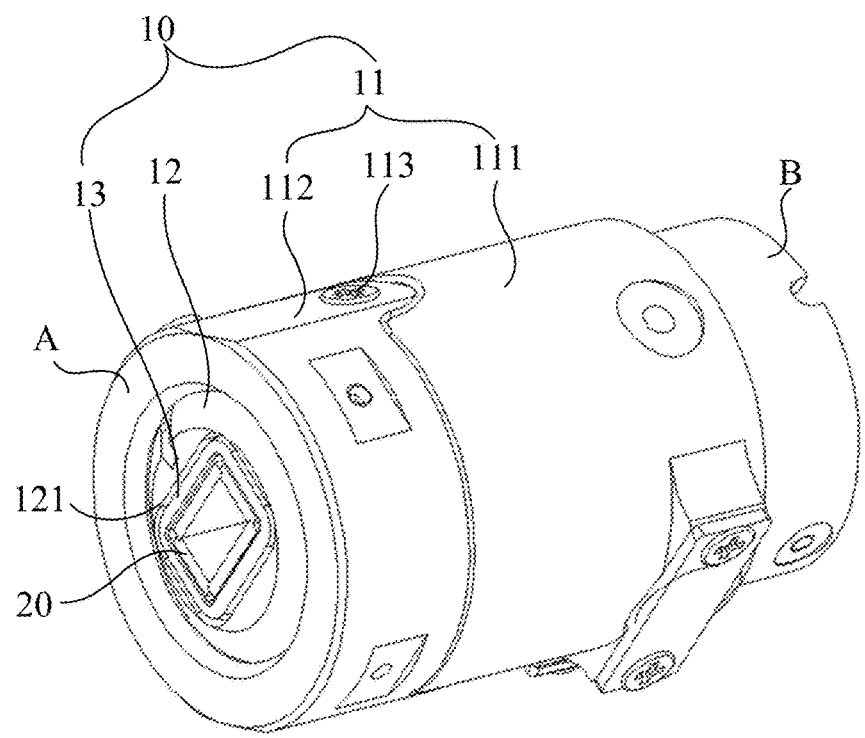
FIG. 4 shows a perspective view of an adjusting device for a light-pipe according to some embodiments of the present disclosure.
Figure 5:
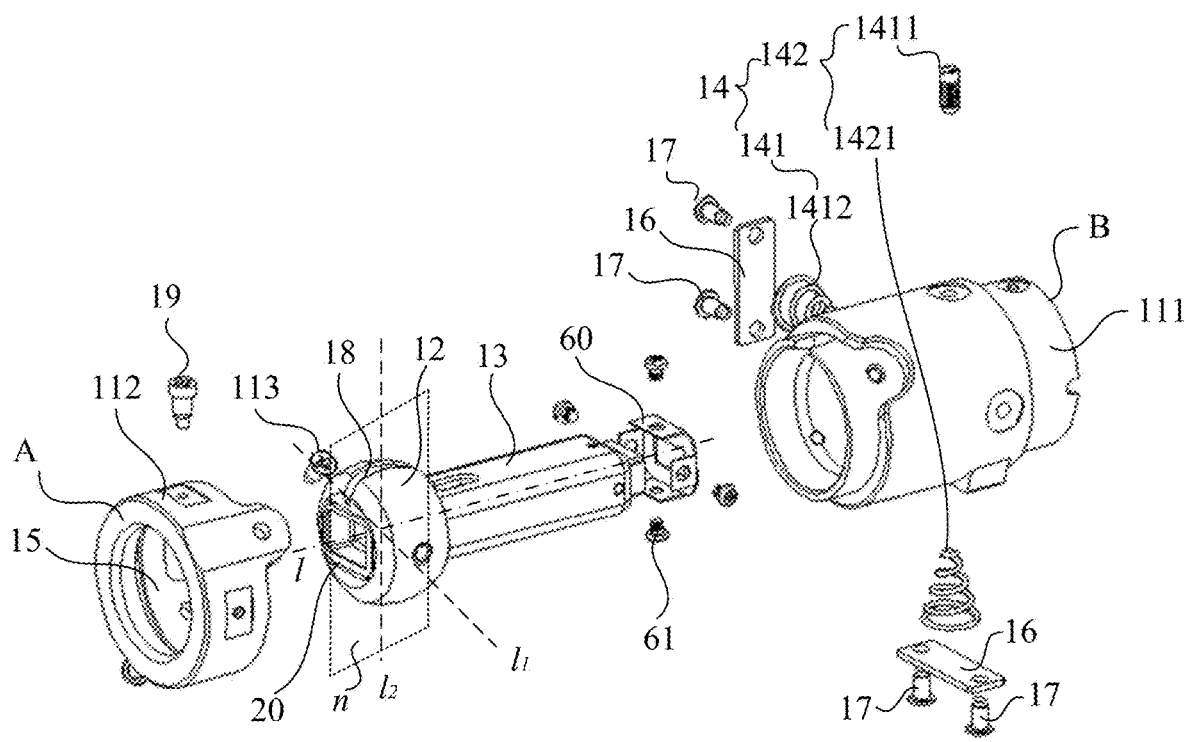
FIG. 5 shows an exploded view of the adjusting device for a light-pipe shown in FIG. 4.
Figure 6A:
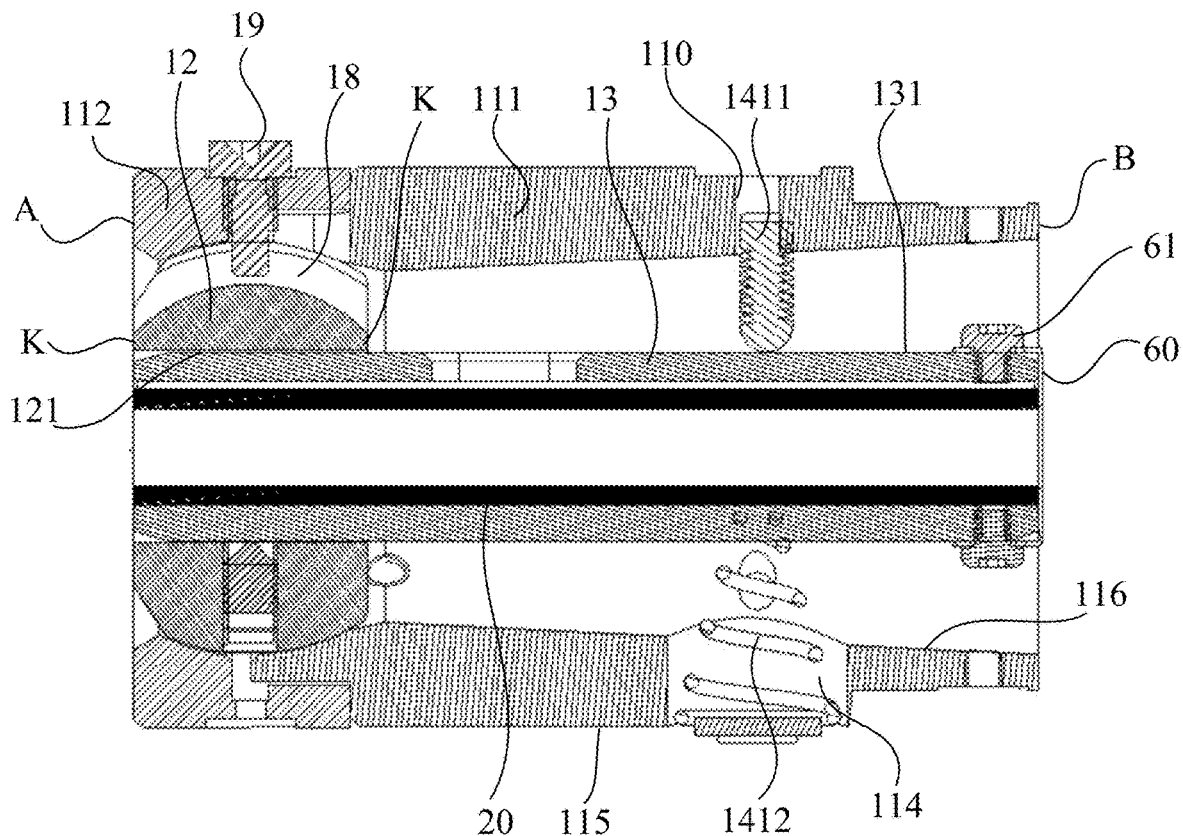
FIG. 6 (a) shows a sectional view of the adjusting device for a light-pipe shown in FIG. 4 in the axial direction of the light-pipe.
FIG. 6(b) shows a schematic view of an adjustment member provided by some embodiments of the present disclosure.
Figure 6:
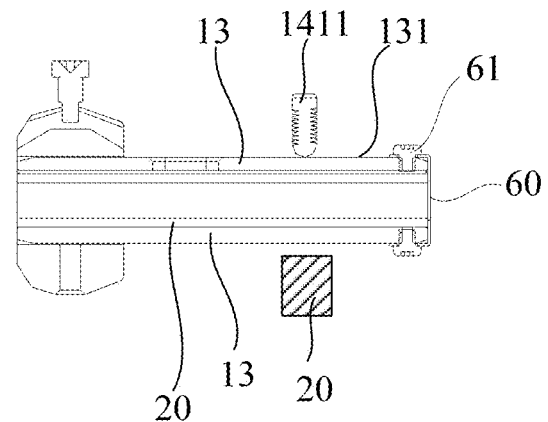

FIG. 4 shows an adjusting device 10 for a light-pipe according to some embodiments of the present disclosure. FIG. 5 is an exploded view of the adjusting device for a light-pipe shown in FIG. 4. FIG. 6(a) is a sectional view of the adjusting device for a light-pipe shown in FIG. 4 in the axial direction of the light-pipe. Referring to FIGS. 4, 5 and 6 (a), the adjusting device 10 for a light-pipe of the present embodiment includes an outer tube 11, a rotatable ball 12, an inner tube 13 and an adjustment member 14. A light-pipe 20 is accommodated in the inner tube 13. The inner tube 13 is configured to accommodate a light-pipe 20. The outer tube 11 includes a first end A and a second ends B disposed oppositely. As shown in FIG. 6(a), a receiving cavity 15 for accommodating the rotatable ball 12 is formed in the first end A of the outer tube 11, and the rotatable ball 12 is hinged in the receiving cavity 15. A through-hole 121 is opened in the rotatable ball 12. One end of the inner tube 13 is fixedly connected to the through-hole 121, and the other end of the inner tube is disposed in the second end B of the outer tube 11 through the adjustment member 14. The interior of the inner tube 13 is used to transmit a light beam. The adjustment member 14 is configured to drive the inner tube 13 to swing around the center of the rotatable ball 12 within the outer tube 11.

In some embodiments, one end of the inner tube 13 is fixedly connected to the through-hole 121 through the wall of inner tube 13 at the one end fixed with the wall of the through-hole 121, that is the one end of the inner tube 13 is nested in the through-hole 121.

In some embodiments, a receiving cavity 15 for accommodating the rotatable ball 12 is formed in the inner sidewall of the first end A of the outer tube 11.

In the adjusting device 10 for a light-pipe provided by the present disclosure, as shown in FIG. 5, the receiving cavity 15 is formed in the first end A of the outer tube 11. As shown in FIG. 6(a), the rotatable ball 12 is hinged in the receiving cavity 15, and the rotatable ball 12 is provided with a through-hole 121. One end of the inner tube 13 is fixedly connected to the through-hole 121, and the other end of the inner tube 13 is disposed inside the second end B of the outer tube 11 through the adjustment member 14. The interior of the inner tube 13 is used to transmit a light beam. The adjustment member 14 is configured to drive the inner tube 13 to swing around the center of the center of the rotatable ball 12 within the outer tube 11. When the adjusting device 10 for a light-pipe is installed in a projector, firstly the light-pipe 20 may be fitted into the inner tube 13 of the adjusting device 10. Then, the adjusting device 10 with the light-pipe 20 is installed between the light source component and the imaging component, with the first end A of the outer tube 11 of the adjusting device 10 facing the light exit side of the light source component, and the second end B facing the light entrance on the shell of the imaging component. The end surface of the light-pipe 20, which is located inside the first end A of the outer tube 11, is opposite to the light exit side of the light source component. That is, the first end A receives the incident light from the front through an opening thereon and allows the received light to exit the second end B after passing through the homogenizer rod. In this way, one end of the light-pipe 20 located inside the first end A of the outer tube 11 is the light entrance end, and the other end located inside the second end B of the outer tube 11 is the light exit end. The position of the light exit end of the light-pipe 20 may be adjusted by driving the inner tube 13 to swing around the center of the rotatable ball 12 in the outer tube 11 by the adjustment member 14, so that the end surface of the light exit of the light-pipe 20 is aligned with the light entrance on the shell of the imaging component.

Compared with the exemplary embodiment shown in FIGS. 1 and 2, in the embodiments of the present disclosure, the rotatable ball 12 and the receiving cavity 15 form a ball joint coupling. Since the accuracy of the position limiting of the ball joint coupling is relatively high, when the light exit end of the light-pipe 20 is adjusted, the position of the light entrance end of the light-pipe 20 is effectively limited to the position of the ball joint coupling, thereby reducing the possibility of misalignment of the light entrance end of the light-pipe 20. As a result, the light-pipe 20 is prevented from being deflected as a whole in the outer tube 11, thereby reducing the adjustment difficulty of the adjusting device 10 and improving the adjustment efficiency.

In some embodiments, when the position of the light exit end of the light-pipe 20 is adjusted by the adjusting device 10, the end surface of the light entrance end of the light-pipe 20 also generates a certain amount of shift around the center of the ball. However, since the light entrance end of the light-pipe 20 and the rotatable ball 12 are all located in the first end A of the outer tube 11, so when the light exit end of the light-pipe 20 is adjusted, the shift of the end surface of the light entrance end of the light-pipe 20 is very small. This small shift can be considered to be within the allowable range of deviation.

In some embodiments of the present disclosure, the outer tube 11 may be a one-piece structure, or may be formed by connecting a first tube section 111 and a second tube section 112 through a first connecting screw 113 as shown in FIG. 4. There is no specific restriction on this.

In some embodiments of the present disclosure, the cross-sectional shape of the outer tube 11 may be a circle, a square, a rectangle, a polygon, or the like, which is not specifically limited herein. Moreover, the cross-sectional shape of the inner tube 13 may be square, rectangular or the like, which is not specifically limited. As long as the shape of the inner hole of the inner tube 13 matches the contour shape of the light-pipe 20, so that the light-pipe 20 can be accommodated in the inner tube 13.

In some embodiments of the present disclosure, the central axis of the through-hole 121 passes through the center of the rotatable ball 12. In other embodiments of the present disclosure, the central axis of the through-hole 121 does not pass through the center of the rotatable ball 12. It is not specifically limited herein. However, in order to reduce the shift amount of the end surface of the light entrance end of the light-pipe 20 when adjusting the position of the light exit end of the light-pipe 20, the center axis of the through-hole 121 in the direction of the hollow cavity may pass through the center of the rotatable ball 12. In this way, the distance between the center of the end surface of the light entrance end of the light-pipe 20 and the center of the rotatable ball 12 is small, and when the light exit end of the light-pipe 20 is adjusted, the shift of the end surface of the light entrance end of the light-pipe 20 is small, so that the end surface of the light entrance end of the light-pipe 20 and the light exit side of the light source component can always be kept in alignment.

In some embodiments of the present disclosure, in order to reduce the width of the rotatable ball 12 in a direction of the axial of the outer tube 11, as shown in FIG. 6(a), the rotatable ball 12 is provided with flat portions K at both ends in the direction of the axial of the outer tube 11. By structuring the flat portions K on the rotatable ball 12, the width of the rotatable ball 12 in the direction of the axial of the outer tube 11 can be reduced, so as to facilitate reducing the distance between the light entrance end of the light-pipe 20 and the center of the rotatable ball 12. In this way, when adjusting the position of the light-pipe 20 by the adjusting device 10, the shift amount of the light entrance end of the light-pipe 20 in the radial direction of the outer tube 11 can be reduced, so that the end surface of the light entrance end of the light-pipe 20 can always be aligned with the end surface of the light exit end of the light source component. On the other hand, by providing the flat portions K on the rotatable ball 12, the contact area between the rotatable ball 12 and the inner wall of the receiving cavity is reduced, thereby reducing the friction between the rotatable ball 12 and the inner wall of the receiving cavity, and improving the rotation flexibility of the rotatable ball 12 in the receiving cavity 15.

In some embodiments, the rotatable ball 12 includes a first end surface and second end surface oppositely disposed, and a side surface connected between the first and second end surfaces. The side surface is enclosed to form a hollow cavity body. The distance of the rotatable ball 12 along the central axis of the inner tube 13 is smaller than a diameter of the rotatable ball 12 in the direction perpendicular to the central axis of the inner tube 13. Through-holes are respectively provided in the first and second end surfaces respectively, and the through-holes are connected with the hollow cavity body. The inner tube 13 enters the hollow cavity body from the through-hole of any end surfaces to fix the inner tube 13 and the rotatable ball 12.

In some embodiments, the first and second end surfaces of the rotatable ball 12 are symmetrical about the center of the rotatable ball, and the side surface of the rotatable ball is symmetrical about the center axis of the rotatable ball. The central axis is pointed from the center point of the first end surface to the center point of the second end surface. The side surface is convex relative to the center axis, and the curvature of the side surface is approximately the curvature of a spherical surface.

In some embodiments, the first end of the inner tube 13 may enter the hollow cavity from the through-hole of the first end surface of the rotatable ball 12. The first end of the inner tube 13 can be flush with the second end surface of the rotatable ball 12 at the through-hole 121 in the second end surface.

In some embodiments, the bottom of the receiving cavity is provided with an opening. The opening is corresponded to the through-hole in the second end surface of the rotatable ball 12 and allow light to enter the light-pipe 20 in the inner tube 13. In some implementations, the aperture of the opening is not less than the aperture of the through-hole in the second end surface.

In some embodiments of the present disclosure, in order to allow the rotatable ball 12 to freely rotate within the receiving cavity 15, the surface roughness Ra of the rotatable ball 12 may be within 0.4~0.8 μm. When the surface roughness of the rotatable ball 12 is within this range, the surface smoothness of the rotatable ball 12 is relatively high and the rotatable ball freely rotate within the receiving cavity 15.

In the embodiment shown in FIG. 5, the structure of the adjustment member 14 may have various solutions. In a first alternative solution, the adjustment member may be a structure configured to drive the inner tube 13 to swing along a first rotation axis $I_1$ shown in FIG. 5. The first rotation axis $I_1$ passes through the center of the rotatable ball 12 and the first rotation axis $I_1$ perpendicular to the central axis I of the outer tube 11. In a second alternative solution, the adjustment member may be a structure configured to drive the inner tube 13 to swing along the second rotation axis $I_2$ shown in FIG. 5. The second rotation axis $I_2$ passes through the center of the rotatable ball 12, and any two of the first rotation axis $I_1$, the second rotation axis $I_2$, and the central axis I of the outer tube 11 are perpendicular to each other. In a third optional solution, as shown in FIG. 5, the adjustment member 14 includes a first adjustment member 141 and a second adjustment member 142. The first adjustment member 141 is configured to drive the inner tube 13 to swing along the first rotation axis $I_1$, and the second adjustment member 142 is configured to drive the inner tube 13 to swing along the second rotation axis $I_2$. Compared to the first and second optional solutions described above, when the third optional solution is adopted, the light exit end of the light-pipe can be adjusted in four directions (Including the two opposite directions swinging along the first rotation axis $I_1$ and the two opposite directions swinging along the second rotation axis $I_2$), respectively. In this way, the adjustment range of the light-pipe 20 is wider; the adjustment process is more flexible, and it is more likely that the light exit side of the light-pipe 20 is adjusted to be aligned with the light entrance side of the subsequent optical element.

In the above-mentioned third optional solution, in order to guide the inner tube 13 to swing along the first rotation axis $I_1$, the inner tube 13 to swing along the second rotation axis $I_2$, and prevent the inner tube 13 from rotating with itself as a rotation axis in the outer tube 11, thereby avoiding the projection image generated by the projector from generating a certain angle of deflection relative to the projection screen, the following solution is used. As shown in FIG. 5, a plane perpendicular to the first rotation axis $I_1$ and passes through the center of the rotatable ball 12 is defined as a first reference surface n. The surface of the rotatable ball 12 is provided with a first guide slot 18 which extends along the edge of the cross section of the rotatable ball 12 on the first reference plane n. A first guide post 19 is slidably connected in the first guide slot 18. The first guide post 19 is relatively fixed with the outer tube 11, and the central axis of the first guide post 19 coincides with the second rotation axis $I_2$. In this way, the rotatable ball 12 slides along the first guide post 19 through the first guide slot 18 when the inner tube 13 swings along the first rotation axis $I_1$, and the first guide slot 18 of the rotatable ball 12 rotates with the first guide post 19 as a rotation axis when the inner tube 13 is swinging along the second rotation axis $I_2$. In this way, the rotation path of the inner tube 13 is defined by the cooperation of the first guide slot 18 and the first guide post 19, thereby preventing the inner tube 13 from rotating with itself as a rotation axis in the outer tube 11, and avoiding the projection image generated by the projector from generating a certain angle of deflection relative to the projection screen, thereby enhancing the user's viewing experience.

In some embodiments, as shown in FIG. 5, a plane perpendicular to the second rotation axis $I_2$ and passing through the center of the rotatable ball 12 is defined as a second reference plane (not shown in the figure), and a second guide slot (not shown in the figures) may be provided in the surface of the rotatable ball 12 which extends along the edge of the cross-section of the rotatable ball 12 on the second reference plane. A second guide post is slidably connected in the second guide slot. The second guide post is relatively fixed with the outer tube 11, and the central axis of the second guide post coincides with the first rotation axis $I_1$. In this way, the second guide slot of the rotatable ball 12 rotates with the second guide post when the inner tube 13 swings along the second rotation axis $I_2$, and the rotatable ball 12 slides along the second guide post through the second guide slot as a rotation axis when the inner tube 13 is swinging along the first rotation axis $I_1$.

As shown in FIG. 5, when only one set of guide slot and guide post are provided between the rotatable ball 12 and the outer tube 11, the requirements for guiding and limiting while the inner tube 13 swings along the first rotation axis $I_1$ and the second rotation axis of $I_2$ respectively already are simultaneously satisfied. Therefore, only a group of one guide slot and one guide post is provided between the rotatable ball 12 and the outer tube 11, so as to avoid a phenomenon of sliding jam due to multiple and repeated limits.

In the embodiment shown in FIG. 5, the structures of the first adjustment member 141 and the second adjustment member 142 may include the following two implementations:

The first implementation: each of the first adjustment member 141 and the second adjustment member 142 includes two adjustment screws disposed oppositely. The two adjustment screws are disposed on opposite sides of the inner tube 13 in a diameter direction of the inner tube 13, and in the sidewall of the outer tube 11, a threaded through-hole 110 is opened at a position corresponding to each adjustment screw. One end of the adjustment screw is fit into the threaded through-hole 110, and the other end is in contact with the outer wall 131 of the inner tube 13. In this way, the inner tube 13 is driven to swing within the outer tube 11 by adjusting the adjustment screws on both sides of the inner tube 13 at the same time. The connection line between the two adjustment screws in the first adjustment member may be perpendicular to the connection line between the two adjustment screws of the second adjustment member.

The second implementation: each of the first adjustment member 141 and the second adjustment member 142 includes an adjustment screw and an elastic piece disposed oppositely. The adjustment screw and the elastic piece are respectively disposed on two opposite sides of the inner tube 13 in a diametrical direction, and a threaded through-hole 110 is opened in the side wall of the outer tube 11 and at a position corresponding to the adjustment screw. One end of the adjustment screw is fit into the threaded through-hole 110, and the other end is in contact with the outer wall 131 of the inner tube 13. The elastic piece is used to apply an elastic force directing toward the adjustment screw to the inner tube 13. In this way, by rotating the adjustment screws, the inner tube 13 is driven to swing along the first rotation axis $I_1$ or the second rotation axis $I_2$. The connection line between the adjustment screw and the elastic piece of the first adjustment member may be perpendicular to the connection line between the adjustment screw and the elastic piece of the second adjustment member.

The second implementation may be expressed as following: as shown in FIG. 5, the first adjustment member 141 includes a first adjustment screw (not shown in the figure) and a first elastic piece 1412 disposed oppositely, and the first adjustment screw and the first elastic piece 1412 cooperate with each other to drive the inner tube 13 to swing along the first rotation axis $I_1$. The second adjustment member 142 includes a second adjustment screw 1411 and a second elastic piece 1421 disposed oppositely. The second adjustment screw 1411 and the second elastic piece 1421 cooperate with each other to drive the inner tube 13 to swing along the second rotation axis $I_2$.

Compared to the first implementation above, in the case that the first adjustment member 141 and the second adjustment member 142 adopt the structure shown in the foregoing second implementation, only the adjustment screw on one side of the inner tube 13 needs to be rotated to adjust the light exit end of the light-pipe 20 to realize the adjustment of the light exit end of the light-pipe 20, and it is not necessary to adjust the adjustment screws on both sides of the inner tube 13 simultaneously. Therefore, the operation process is simple, the efficiency is high, and it is easy to implement.

The structures of the first adjustment member 141 and the second adjustment member 142 are not limited to the first and second implementation described above, and may be other configurations. Illustratively, in some embodiments of the present disclosure, referring to FIG. 6(*b*), the first adjustment member 141 and the second adjustment member 142 each include an adjustment screw and a magnet 140 disposed oppositely. The adjustment screw and the magnet 140 are respectively disposed on the two opposite sides of the inner tube 13 in a diameter direction of the inner tube 13, and a threaded through-hole 110 is opened in the side wall of the outer tube 11 and at the position corresponding to the adjustment screw. One end of the adjustment screw is fit into the threaded through-hole 110, and the other end is in contact with the outer wall 131 of the inner tube 13. The inner tube 13 is made of magnetic material, and between the inner tube 13 and the magnet 140 there is a magnetic repulsion. Thus, the magnet 140 apply a magnetic force directed toward the adjustment screw to the inner tube 13, and the position of the light exit end of the light-pipe is adjusted by rotating the adjustment screw.

The first elastic piece 1412 and the second elastic piece 1421 each may include an elastic sheet, a coil spring, a rubber-like elastic material member, and the like, which are not specifically limited herein. However, since rubber-like elastic material is prone to aging and deterioration after a long period of use, the life span is short. Therefore, in order to extend the life of the elastic piece, in some embodiments of the present disclosure, as shown in FIG. 5, the first elastic piece and the second elastic piece are coil springs or elastic sheets. In some embodiments of the present disclosure, both the first elastic piece and the second elastic piece are coil springs. The elastic force of the coil spring is large and easily controlled. The adjustment of the elastic force is realized simply by adjusting the rigidity of the coil spring. The surface of the coil spring is smooth which can prevent jamming, and at the same time the technical requirements for the assembly workers also are low.

In the embodiment shown in FIG. 5 and FIG. 6(*a*), the first elastic piece 1412 and the second elastic piece 1421 are coil springs extending in the radial direction of the outer tube 11. One end of the coil spring is relatively fixed with the inner wall 116 of the outer tube 11, and the other end is connected to the outer wall 131 of the inner tube 13.

In order to provide sufficient installation space for the first elastic piece 1412 and the second elastic piece 1421, in some embodiments of the present disclosure, as shown in FIG. 6(*a*), the outer tube 11 is provided with a receiving through-hole 114 for accommodating the first elastic piece 1412 or the second elastic piece 1421. As shown in FIG. 5, a cover plate 16 is provided on the outer wall 115 of the outer tube 11 at the position corresponding to the receiving through-hole 114. The cover plate 16 is connected to the outer tube 11 by a second connecting screw 17. As a result, sufficient installation space is provided for the first elastic piece 1412 and the second elastic piece 1421.

In some embodiments, one end of the spring abuts on the outer wall of the inner tube 13, and the other end abuts on the inner side of the cover plate 16. The cover plate 16 has a long strip structure, and the two opposite ends of the long strip structure are provided with a screw hole, respectively. Two screws are installed in the two screw holes and through the two screws, the pressure of the spring on the inner tube is adjusted. Since there is a certain contact area between the spring and the inner surface of the cover plate 16, the fineness of adjustment is improved by adjusting the two screws through the oppositely arranged screw holes respectively.

Figure 7:
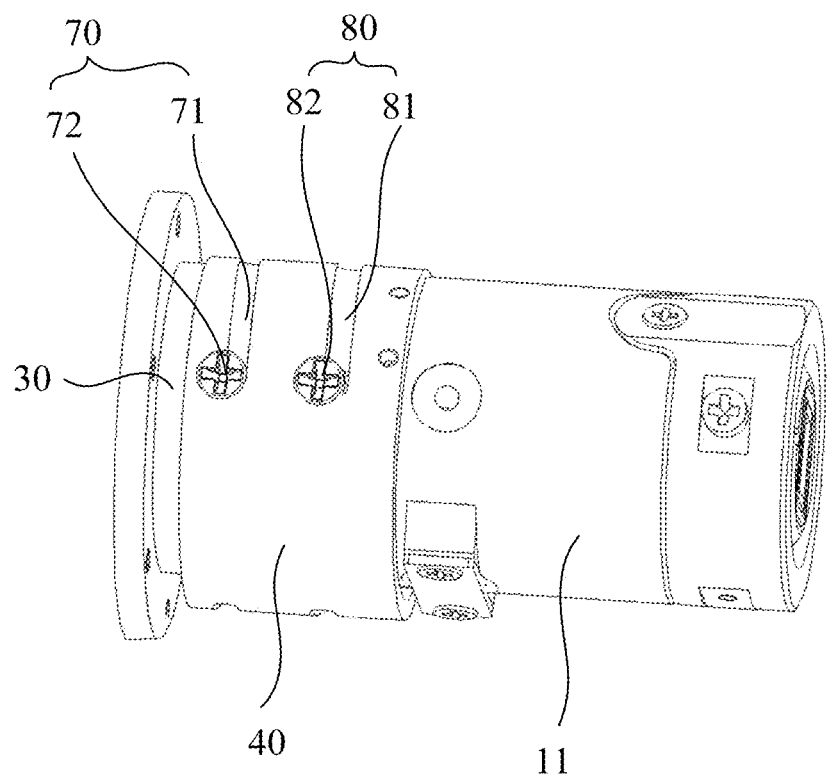
FIG. 7 shows a perspective view of an adjusting device for a light-pipe according to other embodiments of the present disclosure.
Figure 8:
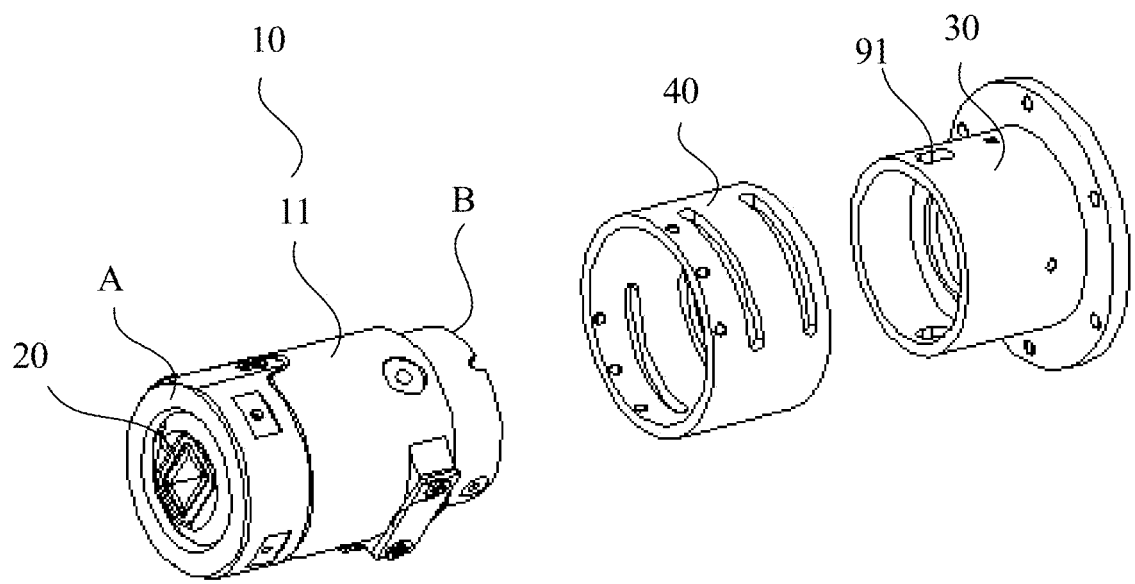
FIG. 8 shows an exploded view of the adjusting device for a light-pipe shown in FIG. 7.

In order to adjust the position of the light exit end of the light-pipe 20 relative to the imaging component or the light source component in the axis direction of the outer tube 11, in some embodiments of the present disclosure, the following solution is adopted: as shown in FIGS. 7 and 8, the adjusting device 10 for a light-pipe also includes a support tube 30 and a sleeve 40. The support tube 30 is located on the side of the second end B of the outer tube 11 away from the first end A of the outer tube 11. The support tube 30 is disposed coaxially with the outer tube 11, and the end of the support tube 30 away from the outer tube 11 is used to fix relatively with the shell of the imaging component. As shown in FIG. 7, the sleeve 40 is rotatably sleeved outside the support tube 30 and the outer tube 11, a first guide structure 70 is connected between the sleeve 40 and the support tube 30, and a second guide structure 80 is connected between the sleeve 40 and the outer tube 11. When the sleeve 40 is rotated relative to the support tube 30 and the outer tube 11, the first guide structure 70 and the second guide structure 80 cooperate with each other to guide the outer tube 11 to move toward or away from the support tube 30 in a direction of the axis of the support tube 30. In this way, the position of the light exit end of the light-pipe 20 is adjusted relative to the imaging component or the light source component in the axial direction of the outer tube 11, thereby further achieving a position adjustment of the light exit end of the light-pipe 20 in two opposite directions of the axial direction of the outer tube 11 based on the position adjustment of the light exit end of the light-pipe 20 in two opposite directions along the first rotation axis $I_1$ and two opposite directions along the second rotation axis $I_2$. The adjustment directions of the light exit end of the light-pipe 20 are increased from four to six and the flexibility is higher.

In some embodiments of the present disclosure, the first guide structure 70 and the second guide structure 80 may be fabricated as shown in FIG. 7. That is, the first guide structure 70 includes a first guide slot 71 and a first slide piece 72 slidably connected in the first guide slot 71, and the second guide structure 80 include a second guide slot 81 and a second slide piece 82 slidably connected in the second guide slot 81. The first slide piece 72 is relatively fixed with the support tube 30, and the second slide piece 82 is relatively fixed with the outer tube 11. The first guide slot 71 and the second guide slot 81 are all provided on the sleeve 40, and the first guide slot 71 and the second guide slot 81 both extend in the circumferential direction of the sleeve 40. The first guide slot 71 and the second guide slot 81 are not parallel. In this way, when the sleeve 40 is rotated relative to the support tube 30 and the outer tube 11, the first slide piece 72 slides within the first guide slot 71, and the second slide piece 82 slides within the second guide slot 81; in the axial direction of the support tube 30, the distance between the first slide piece 72 and the second slide piece 82 changes, and the outer tube 11 is driven to move toward or away from the support tube 30 in the axis direction of the support tube 30, so that an adjustment of the light-pipe 20 in the axis direction of the outer tube is realized. This structure is simple and easy to implement.

In some embodiments of the present disclosure, at least one of the first guide slot 71 and the second guide slot 81 is a cam slot.

In some embodiments of the present disclosure, as shown in FIG. 7, the first slide piece 72 and the second slide piece 82 are set screws. When the set screw is loosened, the sleeve 40 may be rotated to adjust the position of the light-pipe 20 along the axis of the outer tube 11. When the light-pipe 20 is adjusted to a predetermined position, the set screw is tightened to achieve a fixed position of the light-pipe 20.

In some embodiments as shown in FIGS. 7 and 8, in order to allow the first slide piece 72 and the second slide piece 82 to slide freely in the first guide slot 71 and the second guide slot 81 respectively, the roughness Ra of the inner wall of the first guide slot 71 and the second guide slot 81 may be about 0.4 to about 0.8 μm. When the roughness of the inner walls of the first guide slot 71 and the second guide slot 81 is within this range, the smoothness of the inner walls of the first guide slot 71 and the second guide slot 81 is high, and the first slide piece 72 and the second slide piece 82 is permitted to slide freely within them.

Figure 9:
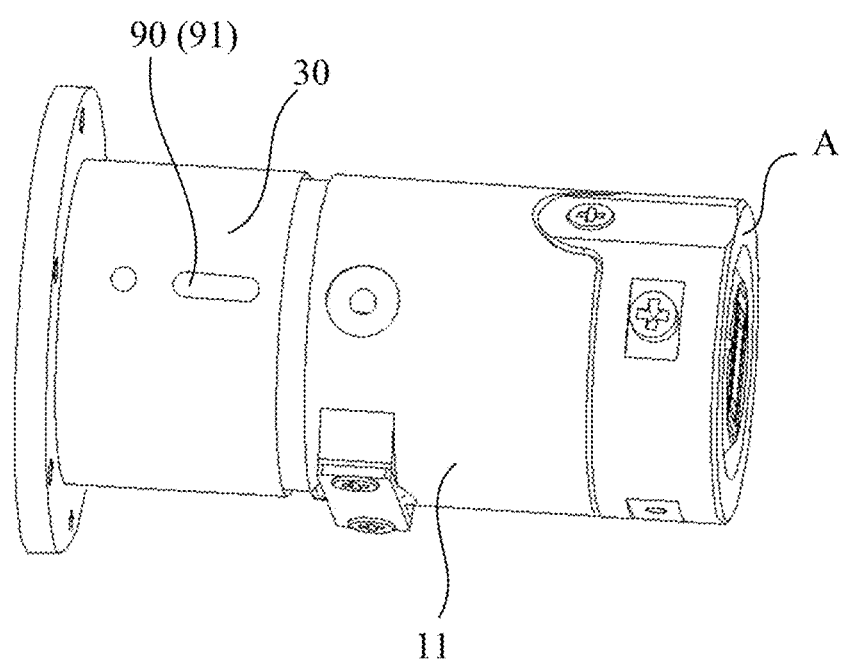
FIG. 9 shows a perspective view of the adjusting device for a light-pipe shown in FIG. 7 after removing the sleeve, the first slide piece and the second slide piece.

In some embodiments as shown in FIGS. 7 and 8, in order to prevent the outer tube 11 from rotating with itself as a rotation axis relative to the support tube 30 while moving in a direction of the axis of the support tube 30, as shown in FIG. 9, a limiting structure 90 may be provided between the outer tube 11 and the support tube 30. The limiting structure 90 is configured to prevent the outer tube 11 from rotating relative to the support tube 30 when the outer tube 11 moves toward or away from the support tube 30 in the axis direction of the support tube 30. In this way, the movement direction of the outer tube 11 is defined by the limiting structure 90, and the outer tube 11 is prevented from rotating relative to the support tube 30. Thus, the rotation of the light-pipe 20 relative to the support tube 30 is prevented, and the projection images is prevented from generating a certain angle of deflection with respect to the projection screen, thereby improving the viewing experience of the user.

The specific form of the limiting structure 90 may be various, and it is not specifically limited herein. As shown in FIG. 8 and FIG. 9, the end of the support tube 30 near the outer tube 11 is rotationally sleeved outside the outer tube 11, and the limiting structure 90 includes a limiting hole 91 opened in the support tube 30. The limiting hole 91 extends in the axial direction of the support tube 30, the limiting hole 91 is opposite to the second guide groove, and the second guide piece is fit into the limiting hole 91. In this way, when the second slide piece slides along the second guide slot to drive the outer tube 11 to move in the direction of the axis of the support tube 30, the second slide piece slides within the limiting hole 91, effectively preventing the outer tube 11 from rotating relative to the support tube 30. The structure is simple and easy to implement, and the limiting hole 91 and the second guide slot correspond to the same slide piece, which reduce the number of components of the projector and the cost.

In some embodiments as shown in FIG. 6(a), an adjustment margin of the adjustment screw may be between ±0.5~±2 mm, so that a stepless adjustment in the range of 0 to k in the two opposite directions of swinging along the first rotation axis $I_1$ or the second rotation axis $I_2$, may be achieved, wherein k is the maximum adjustment margin in the positive and negative directions of the adjustment screw and 0.5 mm≤k≤2 mm. In this way, the adjustment margin of the adjustment screw is moderate, and the position of the light exit end of the light-pipe is adjusted to a state being aligned with the light entrance on the shell 200 of the imaging component, and too long adjustment time due to excessive adjustment margin also is avoided. As a result, the adjustment efficiency is improved and the adjustment process of the light-pipe may be completed within about 5 minutes.

In some embodiments of the present disclosure, in order to adjust the position of the light exit end of the light-pipe accurately and rapidly, a scale mark may be set on the adjustment screw. Through the scale mark, the movement distance of the adjustment screw in the axis direction of the adjustment screw may be accurately known. In this way, an accurate and rapid adjustment of the light exit end of the light-pipe is achieved.

Figure 10:
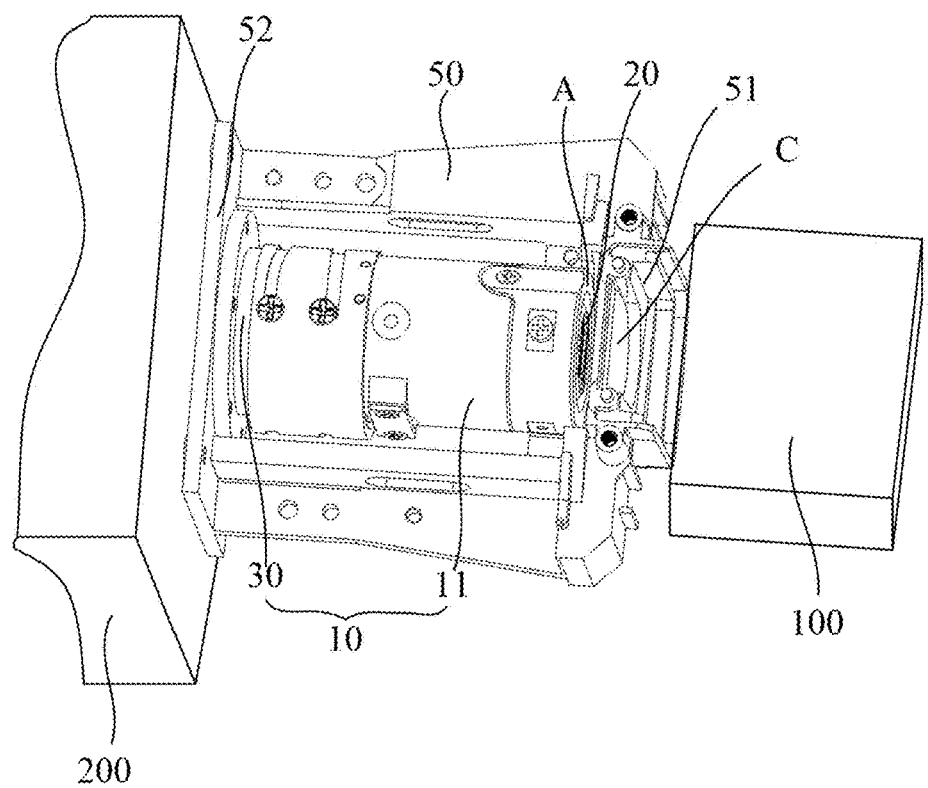
FIG. 10 shows a perspective view of a projector according to some embodiments of the present disclosure.

FIG. 10 is an embodiment of a projector according to an embodiment of the present disclosure. Referring to FIG. 10, the projector of this embodiment includes a light source component 100, a light-pipe 20, an adjusting device 10 for the light-pipe, and an imaging component with a shell 200. The shell 200 is located on the light exit end of the light source component 100. A light entrance (not shown in the figure) is opened on the shell 200 at the position opposite to the light exit side of the light source component 100. The adjusting device 10 is provided between the light exit side of the light source component 100 and the light entrance of the shell 200. The adjusting device 10 is an adjusting device described in any of the above solutions. The first end A of the outer tube 11 of the adjusting device 10 faces the light exit side of the light source component 100, and the second end of the outer tube 11 faces the light entrance of the shell 200. The light-pipe 20 is accommodated in the inner tube 13 of the adjusting device 10, and the end surface of the light-pipe 20 located inside the first end A of the outer tube 11 is opposite to the light exit side of the light source component 100.

The projectors according to the embodiments of the present disclosure have the following advantages: one end of the light-pipe 20 located inside the first end A of the outer tube 11 is a light entrance end, and the other end located inside the second end of the outer tube 11 is a light exit end; The light entrance end of the light-pipe 20 is connected to the first end A of the outer tube 11 by a ball joint coupling composed of a rotatable ball 12 and a receiving cavity 15, and the accuracy of limiting position of the ball joint coupling is high, so the position of the light entrance end of the light-pipe 20 is effectively limited to the position of the ball joint coupling, while adjusting the position of the light-pipe 20, thereby reducing the possibility of misalignment at the light entrance end of the light-pipe 20. As a result, the light-pipe 20 is prevented from being deflected as a whole in the outer tube 11, thereby reducing the adjustment difficulty of the adjusting device 10 and improving the adjustment efficiency.

In some embodiments of the present disclosure, in order to prevent the light-pipe 20 from dropping out of the inner tube 13, as shown in FIG. 5 and FIG. 6(a), the end of the inner tube 13 is provided with a drop-out prevention structure 60 for preventing the light-pipe 20 from dropping out of the inner tube 13. The drop-out prevention structure 60 may be a set screw or a limit stop as shown in FIG. 5 and FIG. 6(*a*). The limit stop is connected to the end of the inner tube 13 through a third connection screw 61. The drop-out prevention structure 60 may also be in other structural forms, which is not specifically limited as long as it can prevent the light-pipe 20 from dropping out from the opening of the end of the inner tube 13.

Figure 11:
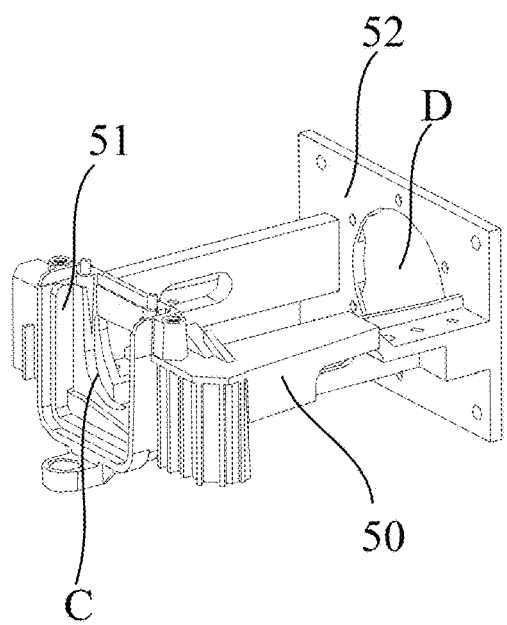
FIG. 11 shows a perspective view of the support frame in FIG. 10.

In some embodiments of the present disclosure, in order to fix the relative positions of the light source component 100, the adjusting device 10 for a light-pipe and the shell 200, as shown in FIGS. 10 and 11, the projector further includes a support frame 50. The support frame 50 includes a first side 51 and a second side 52 oppositely disposed. The adjusting device 10 is located in the support frame 50, and the first end A of the outer tube 11 faces the first side 51, and the end of the support tube 30 of the adjusting device 10 away from the outer tube 11 faces the second side 52. A first light passing hole C is formed in the first side 51 at a position opposite to the end surface of the first end A of the outer tube 11. The light source component 100 is connected to the outer surface of the support frame 50 at the position corresponding to the first light passing hole C, and the light exit side of the light source component 100 is opposite to the first light passing hole C. A second light passing hole D is formed in the second side 52 opposite to the end surface of the support tube 30 away from the outer tube 11. The circumference of the end of the support tube 30 away from the outer tube 11 is connected with the edge of the inner side of the support frame 50 at the second light passing hole D. That is, the end of the support tube 30 away from the outer tube 11 is connected with the inner side wall of the second light passing hole. The shell 200 is connected to the outer surface of the support frame 50 at the position corresponding to the second light passing hole D, and the light entrance on the shell 200 is opposite to the second light passing hole D. In this way, the relative position of the light source component 100, the adjusting device 10 and the shell 200 of the imaging component is fixed by the support frame, and the relative position accuracy between the light source component 100, the adjusting device 10, and the shell 200 of the imaging component are ensured.

Figure 12:
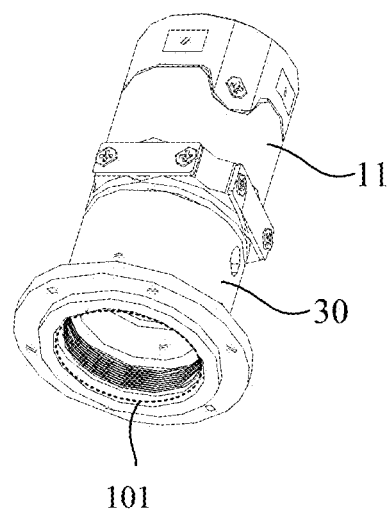
FIG. 12 shows an assembled view of a support tube and an inner tube with a light-transmitting lens mounted thereon.

In some embodiments of the present disclosure, in order to prevent water or dust in the outside air from being introduced into the shell 200 through the support tube 30, as shown in FIG. 12, a transparent lens 101 is provided in the support tube 30. The circumference of the edge of the transparent lens 101 is sealed and connected to the inner wall of the support tube 30, thereby sealing the through-holes 121 (not shown in FIG. 12) in the support tube 30 through the transparent lens 101, effectively preventing water or dust in the outside air from being introduced into the shell 200 through the support tube 30.

The adjusting devices for a light-pipe and the projectors provided by the present disclosure reduce the possibility of misalignment of the light entrance end of the light-pipe when adjusting the position of the light exit end of the light-pipe, thereby preventing the position of the light-pipe from being deflected. As a result, the adjustment difficulty of the adjusting device for a light-pipe is reduced, and the adjustment efficiency is improved.

In the descriptions of the implementations, specific features, structures, materials or characteristics can be combined appropriately in any one or more embodiments or examples.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It can be understood that the above embodiments are merely illustrative embodiments for the purpose of illustrating the principles of the disclosure, but the disclosure is not limited thereto. It will be apparent to those skilled in the art that various changes and modifications can be made therein without departing from the spirit and essence of the disclosure, which are also considered to be within the scope of the disclosure.

Additional embodiments including any one of the embodiments described above may be provided by the disclosure, where one or more of its components, functionalities or structures is interchanged with, replaced by or augmented by one or more of the components, functionalities or structures of a different embodiment described above.

The foregoing descriptions merely show specific implementations of the present disclosure, and the protection scope of the present disclosure is not limited thereto. Any person of skill in the art can readily conceive of variations or replacements within the technical scope disclosed by the embodiments of the present disclosure, and these variations or replacements shall fall into the protection scope of the present disclosure. Accordingly, the protection scope of the present disclosure shall be subject to the protection scope of the claims.

What is claimed is:

1. An adjusting device for a light-pipe, the adjustment device comprising:
 a rotatable ball;
 an outer tube comprising a first outer tube end disposed opposite to a second outer tube end, and a receiving cavity configured to receive the rotatable ball in the first outer tube end;
 an inner tube configured to accommodate the light-pipe;
 an adjustment member; and
 wherein:
  the rotatable ball is hinged in the receiving cavity, and a through-hole is opened in the rotatable ball;
  a first inner tube end is fixedly connected to the through-hole, and a second inner tube end is disposed in the second outer tube end through the adjustment member; and
  the adjustment member is configured to drive the inner tube to swing along the center of the rotatable ball.

2. The adjusting device according to claim 1, wherein the adjustment member comprises a first adjustment member and a second adjustment member; and
 wherein:
  the first adjustment member is configured to drive the inner tube to swing along a first rotation axis;

the second adjustment member is configured to drive the inner tube to swing along a second rotation axis; and both the first rotation axis and the second rotation axis pass through the center of the rotatable ball, and any two of the first rotation axis, the second rotation axis and a central axis of the outer tube are perpendicular to each other.

3. The adjusting device according to claim 2, wherein a reference surface is defined along a plane perpendicular to the first rotation axis and passing through the center of the rotatable ball; and
wherein:
a guide slot is provided on a surface of the rotatable ball and extends along an edge of a cross section of the rotatable ball on the reference surface; and
a guide post is slidably connected in the guide slot and fixed with the outer tube, and the central axis of the guide post coincides with the second rotation axis.

4. The adjusting device according to claim 2, wherein:
each of the first adjustment member and the second adjustment member comprises an adjustment screw and an elastic piece that are oppositely disposed at outer ends of the inner tube along a radial direction of the inner tube;
a threaded through-hole is located in a side wall of the outer tube corresponding to a position of the adjustment screw, one end of the adjustment screw is fit into the threaded through-hole, and another end of the adjustment screw is in contact with the outer wall of the inner tube; and
the elastic piece is configured to apply an elastic force to the inner tube, and the elastic force direct toward the adjustment screw.

5. The adjusting device according to claim 4, wherein a first connection line between the adjustment screw and the elastic piece in the first adjustment member is perpendicular to a second connection line between the adjustment screw and the elastic piece in the second adjustment member.

6. The adjusting device according to claim 4, wherein the elastic piece comprises a coil spring extending in a radial direction of the outer tube, one end of the coil spring is fixed with an inner wall of the outer tube, and another end of the coil spring is connected to the outer wall of the inner tube.

7. The adjusting device according to claim 4, wherein a scale mark is provided on the adjustment screw.

8. The adjusting device according to claim 2, wherein,
each of the first adjustment member and the second adjustment member comprises an adjustment screw and a magnet disposed oppositely, the adjustment screw and the magnet are respectively disposed at the outside of the inner tube in a radial direction of the inner tube;
a threaded through-hole is opened on a side wall of the outer tube at a position corresponding to the adjustment screw, one end of the adjustment screw is fit into the threaded through-hole, and another end of the adjustment screw is in contact with the outer wall of the inner tube; and
the inner tube is made of a magnetic material, and between the inner tube and the magnet there is a magnetic repulsion.

9. The adjusting device according to claim 1, further comprising:
a support tube located at the second outer tube end, and the support tube is disposed coaxially with the outer tube, and a support tube end located away from the outer tube is configured to fix with a shell of an imaging component;
a sleeve configured to be rotatably sleeved outside the outer tube and the support tube, wherein a first guide structure is provided between the sleeve and the support tube, a second guide structure is provided between the sleeve and the outer tube; and
when the sleeve is rotated relative to the support tube and the outer tube, the first guide structure and the second guide structure are configured to cooperate with each other to guide the outer tube to move toward or away from the support tube along a direction of an axis of the support tube.

10. The adjusting device according to claim 9, wherein:
the first guide structure comprises a first guide slot and a first slide piece slidably connected in the first guide slot, and the second guide structure comprises a second guide slot and a second slide piece slidably connected in the second guide slot;
the first slide piece is fixed with the support tube, and the second slide piece is fixed with the outer tube; and
the first guide slot and the second guide slot are both provided on the sleeve, and the first guide slot and the second guide slot both extend in a circumferential direction of the sleeve, and the first guide slot and the second guide slot are not parallel.

11. The adjusting device according to claim 10, wherein the guide slot is a cam slot.

12. The adjusting device according to claim 10, wherein a limiting structure is provided between the outer tube and the support tube, and the limiting structure is configured to prevent the outer tube from rotating relative to the support tube when the outer tube moves toward or away from the support tube along the axis direction of the support tube.

13. The adjusting device according to claim 12, wherein an end of the support tube closer to the outer tube is rotationally sleeved outside the outer tube; and
the limiting structure comprises a limiting hole opened on the support tube, extending in an axial direction of the support tube, and is opposite to the second guide slot, and the second guide piece is fitted into the limiting hole.

14. The adjusting device according to claim 1, wherein the adjustment member comprises a first adjustment member which is configured to drive the inner tube to swing along a first rotation axis; and
the first rotation axis passes through the center of the rotatable ball and is perpendicular to a central axis of the outer tube.

15. The adjusting device according to claim 1, wherein a center axis of the through-hole passes through the center of the rotatable ball.

16. The adjusting device according to claim 1, wherein the rotatable ball is provided with flat portions at both ends in an axial direction of the outer tube.

17. The adjusting device according to claim 1, wherein a surface roughness of the rotatable ball is about 0.4 μm~about 0.8 μm.

18. A projector comprising:
a light source component;
a light-pipe;
an adjusting device for the light-pipe, the adjustment device comprising;
a rotatable ball;

an outer tube comprising a first outer tube end disposed opposite to a second outer tube end, and a receiving cavity configured to receive the rotatable ball in the first outer tube end; and an inner tube configured to accommodate the light-pipe;

an adjustment member;

an imaging component with a shell, wherein the shell is located on a light exit end of the light source component, and a light entrance is opened on the shell at a position opposite to the light exit side of the light source component; and wherein:

the adjusting device is positioned between the light exit side of the light source component and the light entrance of the shell, the first outer tube end faces the light exit side of the light source component, and the second outer tube end faces the light entrance of the shell; and the light-pipe is accommodated in the inner tube of the adjusting device, and an end surface of the light-pipe located inside the first outer tube end is opposite to the light exit side of the light source component.

19. The projector according to claim 18, further comprising:

a support frame including a first side oppositely disposed to a second side, wherein the adjusting device is located in the support frame, and the first outer tube end faces the first side, and an end of a support tube of the adjusting device positioned away from the outer tube faces the second side;

a first light passing hole positioned in the first side at a position opposite to an end surface of the first outer tube end, wherein the light source component is connected to the outer surface of the support frame at a position corresponding to the first light passing hole, and the light exit side of the light source component is opposite to the first light passing hole; and a second light passing hole positioned in the second side at a position opposite to an end surface of the support tube away from the outer tube, wherein the end of the support tube away from the outer tube is connected with an inner side wall of the second light passing hole, the shell is connected to the outer surface of the support frame at position corresponding to the second light passing hole, and the light entrance of the shell is opposite to the second light passing hole.

20. The projector according to claim 19, wherein a transparent lens is provided in the support tube, and a circumference of an edge of the transparent lens is sealed and connected to an inner wall of the support tube.

* * * * *